Patented June 11, 1946

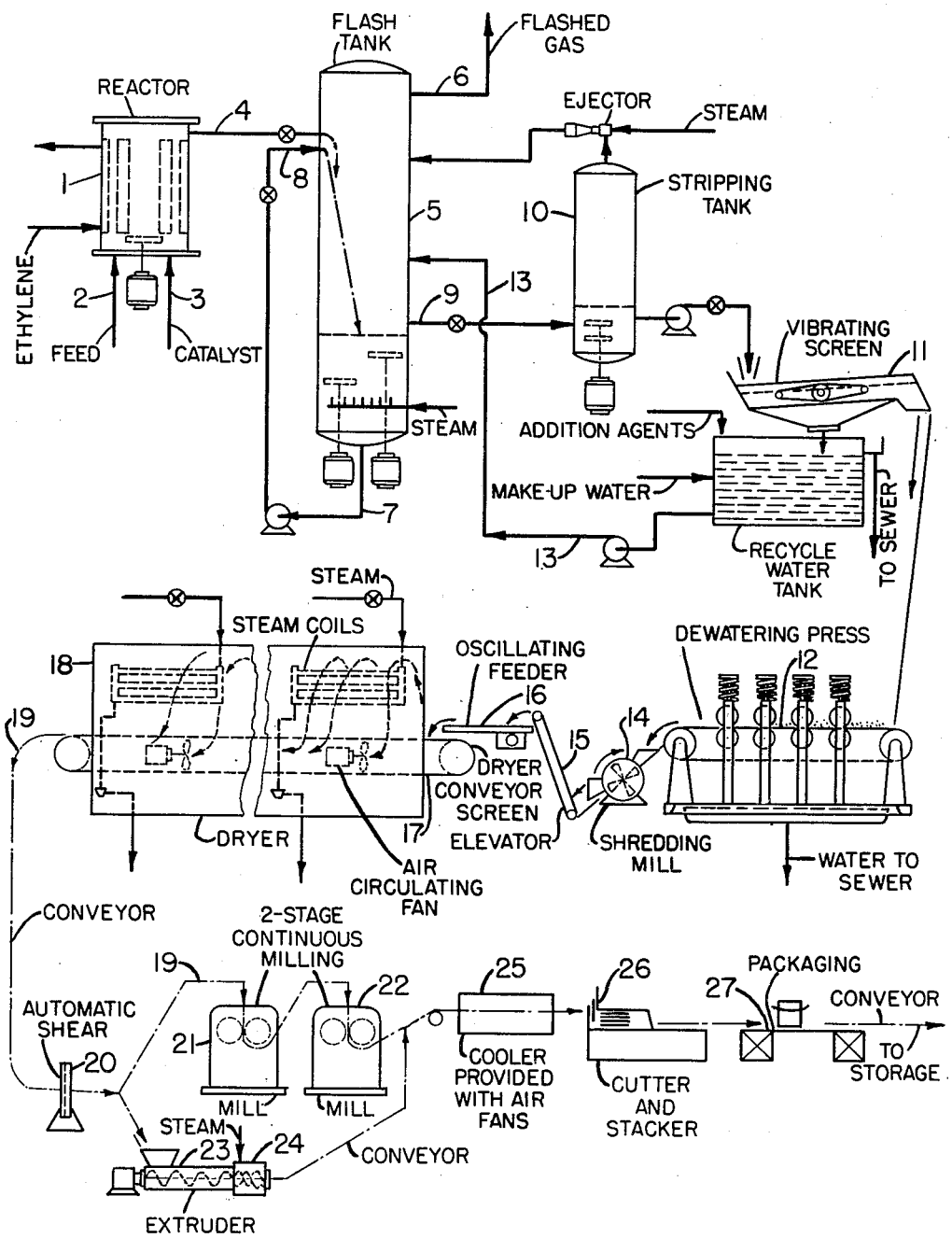

2,401,754

UNITED STATES PATENT OFFICE 2,401,754

PRODUCTION OF POLYMERS

Arthur Donald Green, Cranford, N. J., assignor to Standard Oil Development Company, a corporation of Delaware Application February 19, 1944, Serial No. 523,055

8 Claims. (Cl. 260—93)

1

The invention pertains to the finishing of synthetic rubber-like materials prepared by the polymerization of olefinic materials and particularly mixtures of an isomonoolefin and a diolefin in the presence of a Friedel-Crafts type catalyst at temperatures below about $-10°$ C.

In the preparation of low temperature, synthetic rubber-like polymers, such as polybutene, of mechanical properties similar to those of isomonoolefin-diolefin copolymers such as are described in Australian Patent No. 112,875, issued July 31, 1941, the polymers have been removed from the reaction zone through an extruder. The greater proportion of the volatile materials accompanying the polymer is flashed into the atmosphere during this extrusion operation, the removal of the remainder of said volatile materials being completed by kneading with or without the aid of heat transfer media such as steam or hot water introduced into the kneader and with or without the aid of catalyst destroying agents such as alcohols, carbonyl compounds or alkaline treating agents. Another method utilized in the prior art is to discharge material from the reaction zone into a relatively large body of heated water, removing the lumps of polymer, which have been freed of most of the volatile materials by contact with the heated water, from the water and mechanically working the resulting masses of polymer in an internal mixer, such as a Banbury or a Werner-Pfleiderer type mixer, or in a hot mill such as is used in the rubber industry. In this way, the polymer is dried and freed of the remainder of the occluded volatile hydrocarbon materials thus avoiding the blistering on curing that almost inevitably occurs if such mechanical working is not applied. It has also been the practice to incorporate during such mechanical treatment, one or more stabilizing and/or compounding agents such as sulfur, zinc oxide, magnesium oxide, phenyl beta naphthylamine or other antioxidant, in order to prevent deterioration of the polymer during storage or upon aging.

This method of operation possesses a number of serious disadvantages, particularly when conducted on a rather large scale. For example, in order adequately to wash out the residual catalyst and to remove completely the traces of volatile materials it was necessary to wash and steam the polymer in heavy masticating apparatus that required the expenditure of large amounts of power to effect what was usually only a fair degree of purification of the polymer. Furthermore, on a large scale considerable difficulty and danger is encountered in transferring masses of polymer

2 which still contain volatile, inflammable or toxic materials from one vessel to another. Another disadvantage has been that acidic catalyst residues are usually incompletely leached out of the polymer and these are given off during subsequent heating, causing corrosion of equipment and often contaminating or discoloring the polymer with products of corrosion.

The drying of high molecular weight isoolefin-diolefin low temperature copolymers involves a number of other serious difficulties. The heating and working of the polymer to remove the last traces of water and solvents and to put the polymer into suitable slabs for packaging raises special problems because of the fact that the polymer is plastic, softening and flowing on heating, and also is difficult to handle because it will not "band" and permit efficient milling within certain temperature ranges.

It is the object of this invention to provide the art with a process whereby isoolefin polymers and particularly solid isoolefin-diolefin copolymers may be separated from unreacted hydrocarbons, diluents, catalyst and any by-products contained in the mixture leaving the reaction zone.

It is also the object of this invention to provide the art with an economical and continuous process for the separation and finishing of these polymers, based on maintaining the polymer in finely divided and porous form during the leaching and vaporizing out of the undesirable materials.

It is an important object of this invention to eliminate chlorinated hydrocarbons and acidic catalyst residues from the polymer in such a manner as to avoid exposure of personnel to toxic vapors or irritating fumes, and to prevent corrosion of equipment or contamination of the polymer by the products of corrosion.

A further object of this invention is to produce the polymer under such conditions as do not impair its physical properties and in a form such that these physical properties will not deteriorate during storage.

It is another object of this invention to produce the polymer in a form suitable for storage and shipment to the compounder or fabricator.

These and other objects will appear more clearly from the detailed description and claims which follow.

The process of the present invention comprises a particular sequence of interrelated steps, the successful functioning of the process as a whole depending upon the correct execution of the component operations. The first of these steps involves discharging the mixture of polymer and varying amounts of relatively volatile materials associated with it into a well-agitated body of a liquid flashing medium in which the polymer is suitably insoluble and which is maintained at a temperature well above the boiling point of the majority of the volatile materials accompanying the polymer, and forming a slurry of finely divided polymer particles in the warm flashing medium. This liquid also serves to leach out the bulk of the residual catalyst from the polymer. The second step involves stripping the slurry of polymer in the flashing medium of any residual volatile materials by reducing the pressure thereon to below atmospheric and/or injecting stripping vapors. This may be combined with the first step, if desired. The third step involves removing the bulk of the fluid slurrying medium in a suitable mechanical separating operation. The fourth step is the drying and heating step wherein the residual adhering or occluded fluid is removed from the polymer and at the same time traces of impurities or by-products of relatively low volatility are removed without subjecting the polymer to a temperature or mechanical treatment sufficient to degrade the physical properties of the polymer and without initiating chemical reactions which would induce deterioration of the product in storage. In the final step, the polymer is compressed into a mass of suitable shape and bulk density for convenient and economical shipping and storage.

These steps will be described in greater detail below. Reference is also made to the accompanying drawing illustrating a preferred arrangement of finishing equipment.

The figure is a schematic diagram of apparatus suitable for continuously finishing polymers.

Referring to the drawing, there is shown a reactor 1 wherein isoolefinic materials and preferably mixtures of isoolefinic and diolefinic materials alone or together with a diluent supplied through feed inlet 2 are reacted at low temperatures, preferably around —140° F. by the addition of a Friedel-Crafts type catalyst supplied through line 3. The polymer formed as a slurry of fine solid polymer particles suspended in cold reaction medium comprising unreacted hydrocarbons, diluents, catalyst and catalyst solvent as well as impurities is withdrawn from the reactor through line 4 and is discharged into flash tank 5 wherein the volatile materials associated with the polymer are flashed into vapor. In lieu of discharging the whole slurry withdrawn from the reactor into the flash tank, the slurry may be subjected to a cold filtering or separating operation as described in application Serial No. 483,882, filed April 21, 1943, by A. D. Green and Walter J. Paltz, in order to remove the bulk of the reaction liquid for recycling directly to the reactor whereupon the separated solid polymer particles and adhering liquid are dropped into the flash tank. It is possible in this way to reduce materially the amount of materials volatilized in the flash tank and thereby to reduce the size of the compressing, refrigerating and distillation equipment necessary to recondition the flashed gases for recycling to the reactor. It is also possible to operate the reaction zone with a liquid refrigerant mixed with the reactants (i. e. internal refrigerant) as described in the Australian patent cited. In such case the adhering liquid includes some of this refrigerant. As indicated above, the flashing medium is preferably one in which the polymer is insoluble. A fluid eminently suitable for this purpose is water since it does not dissolve the polymer, is readily separable from the polymer as well as flashed gases and also acts as a catalyst destroying agent, reacting, for example, with $AlCl_3$ to form $Al(OH)_3$ and $HCl$. The flashing medium is desirably maintained at a temperature of about 150° F. in order that it may readily volatilize the liquids associated with the polymer. In order to neutralize the HCl, sodium hydroxide or other alkali may be added to the water. The pH of the water is preferably held around 7.0. If the water is acid, corrosion of the steel equipment occurs; if too alkaline, storage stability of the polymer can suffer, unless special stabilizers are added. The flashed gases are withdrawn from the flash tank through line 6 and are passed to suitable purification and recovery means for reconditioning the flashed materials for reuse in the process.

The water or other liquid flashing medium is heated as by the introduction of steam thereinto and vigorously agitated by means of suitable stirrers or the like to keep the polymer suspended as a uniform slurry in the flashing liquid. Flashing medium may also be withdrawn from the flash tank through line 7 and pumped back into the flash tank as at 8 in such a manner as to impinge against the polymer stream entering the flash tank thereby breaking it up in order to prevent agglomeration of the polymer into relatively large masses which might plug the water slurry system and which might contain excessive amounts of trapped volatile liquid.

The polymer is withdrawn from the flash tank through line 9 as a slurry of finely divided solid particles suspended in the warm flashing liquid and is discharged into the stripping tank 10. The treatment of the polymer as a slurry in the warm fluid, if necessary with injection of stripping vapors such as steam, is carried out to such a degree that nearly all the highly volatile materials originally absorbed in or adsorbed on the polymer and dissolved in the liquid are removed. A preferred type of operation is one in which the volatiles are removed in two zones, the first, as in flash tank 5 at atmospheric or slightly above atmospheric pressure and the other as in stripping tank 10 at below atmospheric pressure. Preferably, the water in the stripper 10 is boiling, due to use of vacuum. The flow of water is usually so large that steam does not have to be added to the stripper when the water enters hot enough.

Stripping as is effected in stripper 10 is highly important to the successful operation of the process. In view of the fact that the volatiles associated with the polymer are highly combustible, as in the case of isobutylene, butadiene, isoprene and the like, or exhibit extreme toxicity, as in the case of chlorinated hydrocarbons such as methyl chloride, they can not be permitted to escape into working areas. Since the polymer is quite finely divided, a maximum of volatiles are removed and led off to suitable recovery equipment thereby not only avoiding fire and health hazards but also permitting recovery of a maximum amount of valuable materials. Upon completion of the stripping operation, the polymer slurry may be safely handled in open equipment.

The slurry of finely divided polymer in warm flashing liquid, desirably water, is passed from the stripping tank 10 through a mechanical dewatering zone such as a rotary vacuum filter, a vibrating screen, an endless screen dewatering press or a rotary disc type of press or combination of two or more of these devices wherein the bulk of the fluid suspending the slurry is removed. In general, there is an economic balance involved in deciding how much dewatering equipment is justified before the dryer in order to decrease the size of the latter. As shown in the drawing, the slurry is discharged from stripping tank 10 onto a vibrating screen 11 and after being separated from the greater part of the suspending liquid, it is discharged into a dewatering press of the endless screen type wherein it is passed between pressure rollers which squeeze out further amounts of water or suspending liquid. The water or the like passing through the vibrating screen is desirably collected, make-up liquid and any desired addition agents, such as alkalies for reducing acidity caused by decomposition of the catalyst, zinc stearate, dispersing agents, etc. are added, whereupon the liquid is recycled to the flash tank through line 13. The liquid removed in the press 12 may be discharged to the sewer or recovered in suitable fashion. If so desired, means may be provided for washing the polymer in the press 12 by providing suitable spray heads between the pressure rollers. Removal of liquid may also be facilitated by provision of suction boxes beneath the endless screen between the pairs of pressure rollers, or one or more of the rollers of the press may be provided with a suction chamber in the zone of contact with the screen.

If a dewatering press, vacuum filter, or other compacting-type equipment is used, suitable disintegrating means such as a hammer mill 14 is preferably provided in order to reduce the size of the polymer particles preparatory to discharge into the dryer system. The polymer particles discharged from the hammer mill are conveyed by suitable means such as an elevator 15 to an oscillating feeder 16 which serves to distribute the polymer on the conveyor screen 17 passing through the dryer 18.

The polymer is treated in dryer 18 under conditions to remove the residual adhering or occluded fluid, usually water, as well as traces of impurities or by-products of relatively low volatility carried through with the polymer from the reaction zone. The drying or removal of the aforesaid impurities or by-products is effected without subjecting the polymer to temperatures or mechanical treatment sufficient to degrade the physical properties of the polymer and without initiating chemical reactions which would induce deterioration of the product in storage. Removal of these last traces of water and impurities is essential since small amounts thereof tend to cause blistering during curing of the polymer. Furthermore, acidic impurities such as catalysts (e. g., $AlCl_3$ or $BF_3$) or their decomposition products (e. g., HCl or HF), are usually not completely leached out of the polymer. Unless these are fixed by the addition of agents such as zinc oxide, they will produce obnoxious fumes during subsequent hot extrusion or milling and in addition to corroding, the extruder or mill will usually discolor and contaminate the polymer with iron compounds. This undesirable behavior is prevented by the practice of this invention, in which heat treatment in a hot air stream provides a convenient means of removing such vaporizable acidic constituents from the polymer before the hot polymer is exposed to the atmosphere of the workroom or to the compressing action of hot steel surfaces.

18 is shown as a continuous conveyor dryer, the polymer being carried through a tunnel on a screen or on sections of perforated plate. While this is the preferred embodiment of the invention, any other type of continuous or semi-continuous dryer may be used as long as forced circulation of warm air in intimate contact with the polymer is obtained. The dryer is preferably of a tunnel, continuous conveyor, through-flow type of either one or more passes, wherein a considerable flow of air is recirculated over steam coils or other heating elements and through or against the bed of polymer material slowly moving through the dryer on a perforated conveyor belt or screen. The prefered drying temperature is dependent upon the molecular weight of the polymer being handled and the time of exposure to said drying temperature. It is desirable, where possible, to avoid softening the polymer in the dryer by too long exposure to high temperatures so as to permit better circulation of air through the bed. However, with some products, softening takes place quite readily and in these cases the avoidance of softening would limit temperatures to a degree which gives very slow drying rates. In such cases, it is usually more effective to accept the softening and the consequent low air rate through the bed and to operate at considerably higher temperatures, limited by the tendency to adhere the polymer to the perforated plates or by the danger of deteriorating the product quality. For rapid conveyor speeds, i. e., short residence times in the dryer, higher drying temperatures can be used than for slow conveyor speeds. It should also be taken into account that the stock temperature in the dryer zones where surface moisture is being removed is not much above the wet bulb temperature of the circulating air. In general, for copolymers of isobutylene and isoprene prepared in the presence of methyl chloride diluent by the addition of aluminum chloride dissolved in methyl chloride and at temperatures around the boiling point of ethylene at atmospheric pressure, the drying temperature will be below about 300° F. and will usually range between 160 and 275° F. for residence times of about 15 minutes to about 3 hours encountered in the usual types of dryers.

Although the temperature of the circulating air is generally below the boiling point of the lower molecular weight polymers, the removal of such materials is efficiently accomplished by maintaining conditions favorable to rapid diffusion such as high air velocities through or over the bed of materials and small polymer particle size. A sufficient quantity of fresh air is introduced at a suitable point or points along the dryer and bled from various other points along the length of the tunnel so that an adequate driving force is available to remove the moisture from the polymer, for example, a wet bulb temperature in the neighborhood of 120° F. or below may be maintained. It is often desirable to vary the prevailing air temperature in the dryer along its length, for example, using higher air temperatures, i. e., dry bulb, at the wet end of the dryer than at the dry or discharge end. The moist exhaust air bled from the dryer is discharged through suitable ducts to the outdoor atmosphere, preferably above the roof, since this exhaust air comes with the acidic vapors, such as HCl, resulting from decomposition of catalyst residues which had been so well embedded in the polymer particles as to have escaped the leaching action of the water. Corrosion of the dryer and ductwork may be prevented by maintaining the surfaces above the dew point of the recirculated and exhaust air streams.

To avoid excessively large equipment the initial moisture content should be below 150% on the dry basis or preferably as low as 15 to 80% on a dry basis. When circulating air through the bed it is usually desirable to maintain a high air flow in order that the conveyor speed can be increased to an extent such that the residence time of the polymers in the dryer is at a minimum consistent with obtaining the desired final moisture content of the product and removal of undesirable volatile materials associated therewith without encountering the disadvantages of exposure to temperatures sufficient to cause breakdown of the polymer. The shape and size of the particles should be such that an adequate velocity of air flow can be obtained through the layer of polymer on the conveyor. The air velocity through the layer of polymer should be at least 30 feet per minute and preferably around 75–350 feet per minute. With the pressure differential available in the usual types of dryers, a bed thickness of about ½" to 5" is used, depending upon the size, shape and percentage of fines in the polymer being dried. It is desirable to carry out the drying operation to a degree sufficient to reduce the moisture content of the polymer to not over about 3% and preferably below 0.5%.

Polymers such as polyisoolefins and copolymers of isoolefins with diolefins prepared at low temperatures in the presence of Friedel-Crafts type catalysts tend slowly to undergo a reduction in molecular weight and a deterioration in physical properties upon prolonged exposure to air at temperatures even as low as 200° F. Also, polymers of the lower molecular weight ranges tend to fuse when subjected to temperatures in the drying range for appreciable lengths of time, tending to decrease the bed thickness and size of voids in the layer of material on the conveyor and causing the polymer to stick to the conveyor, thus decreasing the air flow, increasing the necessary drying time and generally decreasing the efficiency of operation. With medium or low molecular weight stocks, softening may occur so readily that drying rates are very poor if the temperature is maintained low enough to avoid softening. Although higher temperatures give low or almost no air flow through the bed, the corresponding higher vapor pressure and diffusion aids the drying so that it frequently pays to run the dryer as hot as possible. In many cases, therefore, the latter portion of the dryer will operate mainly as an impingement or cross-circulation dryer due to softening and coalescence of the polymer on the dryer belt. In such cases the practical limit on the temperature in the dryer, aside from oxidation or breakdown of the polymer, is set by the tendency of the product to stick to the screen or dryer plates. In order to alleviate the problem of polymer sticking to the dryer surfaces, the conveyor surfaces can be coated with a suitable anti-sticking agent such as zinc stearate, zinc oxide, a soap of an alkaline earth metal, a clay, talc, or similar materials.

The material leaving the dryer 18 needs now merely to be compressed into a mass of suitable shape and bulk density for convenient and economical shipping and storage. The material leaving the dryer may be either in a loose, crumb, flake or spaghetti-like form, such as when fed to the dryer, or it may have softened slightly so as to form a loose, easily frangible mat or it may even have fused into a relatively tough blanket. The polymer is passed from the endless dryer conveyor 17 to conveying means 19 for carrying it to the compressing means. In the case where the material discharged from the dryer is in the form of a blanket, a large automatic shear 20 may be provided to cut it into small, easily handled pieces or a set of tearing rolls or some other mechanical shredder can be used.

The compressing of the polymer may be effected by passing it once or several times through a hot or cold rubber mill to give a relatively compact and smooth sheet which may be cut and stacked or folded into a suitable container, or alternatively, it may be extruded and then packaged in the same way or it may even be baled directly as it comes from the dryer. If small traces of moisture still remain in the material leaving the dryer (as, for example, after drying soft stocks), it is possible to remove this water expeditiously and with a minimum of mechanical breakdown by hot extrusion followed by batch or continuous milling into a suitable sheet. In the drawing, mills 21 and 22 are shown in which the polymer may be subjected to continuous milling in two stages. An extruder 23 which may also, if desired, be provided with a steam jacket 24 may be used for compressing the polymer. With the arrangement shown, the polymer may be milled or extruded or both as desired.

Another purpose of this compressing step in this sequence of finishing operations is to put the polymer into a form having a minimum of surface exposed to the air. The deterioration of the polymer which takes place very slowly during storage even under the best of conditions is known to occur principally at the surface of the material where exposed to the air and, by decreasing the surface area of a given amount of polymer by compacting it, the rate of deterioration is markedly decreased. Also, after proper packaging, the container further reduces the exposure to air and consequent deterioration. The packaging of the compressed polymer is conveniently effected by passing the sheeted polymer from the mill or extruder into a suitable cooler 25 wherein it is cooled to about 160° F. or below and preferably to about room temperature, whereupon it is passed to the cutting and stacking machine 26 and placed in suitable containers as at 27.

It is often desirable to make further provision against deterioration in storage by adding a suitable antioxidant to the polymer at a convenient point in the finishing operation. The presence of such a stabilizer is an insurance against slow deterioration in storage which can be catalyzed by minute traces of impurities, which may at times be introduced in the process in spite of all ordinary precautions. The presence of this stabilizer is desirable in some cases in compounding the product for its ultimate use. Furthermore, under certain conditions, agents which may be added in the water slurry step either as slurrying aids (viz., as protective agents to coat the slurry particles and prevent agglomeration of the polymer in any stagnant portions of the slurry system and/or coalescence in the dryer) or as agents added to control the acidity of the polymer slurry (as may be necessitated by the continual formation of small traces of acids from the catalyst removed from the polymer) may in themselves accelerate storage deterioration. It is often particularly desirable and convenient to add an antioxidant such as phenylbetanaphthylamine, isopropyl diphenylamine, hydroquinone, dibenzyl ether, etc., to the water slurry, as a solution or emulsion.

It is possible to obtain suitable incorporation of such agents in the polymer by adding them to the slurry, followed by passage of the polymer through the dryer and through a simple compressing or sheeting operation. This is a further advantage of the process, as compared to the prior art which, in adding small quantities of such agents to a mass of polymer, required a period of mastication to effect a suitably uniform dispersion.

The present invention is applicable to the finishing of solid, high molecular weight, low temperature polymerizates from isoolefinic materials alone or from mixtures of isoolefinic materials with diolefinic materials capable of copolymerizing with isoolefins at low temperatures in the presence of Friedel-Crafts type catalysts. The preferred isomonoolefin is isobutylene but other isoolefins containing up to about 8 carbon atoms per molecule may be used. The copolymerizable diolefinic materials include butadiene and substituted butadienes, especially isoprene, piperylene and dimethyl butadiene. Other polyolefinic materials containing up to 12 or 14 carbon atoms per molecule such as myrcene and certain non-conjugated diolefins such as dimethylallene and the like are also useful. In the preparation of copolymers, the ratio of isoolefin to diolefin in the reaction liquid is from about 50 to 95 weight per cent of isoolefin to about 50 to 5 weight per cent of diolefin when the latter is a $C_4$ diolefin. With $C_5$ and higher diolefins, the amount of diolefin is less than 10 weight per cent and preferably less than 5 weight per cent.

The catalyst used may be boron fluoride, either gaseous or in solution, or it may be a solution of a Friedel-Crafts type catalyst such as aluminum chloride or the other materials listed on page 375 of the article on "Friedel-Crafts synthesis" by N. O. Calloway, published in "Chemical Reviews," vol. 17, No. 3 in 1935. For catalyst solvent there may be used a mono- or polyhalogenated alkyl solvent containing less than 5 carbon atoms per molecule, carbon disulfide or the like. Diluents that may be used in the process include the alkyl halides containing less than 5 carbon atoms per molecule, preferably methyl chloride, as well as hydrocarbons containing less than 5 carbon atoms, such as methane, ethane, propane, ethylene and the like.

The polymerization is effected by cooling the olefinic materials to temperatures below about −40° C., preferably to around −100° C. or below and adding a Friedel-Crafts type catalyst, as mentioned above. The catalyst, preferably in solution, is also precooled to about reaction temperature prior to introduction into the olefinic material. For a more comprehensive disclosure of the reactants, catalysts, solvents, diluents and the like and the general properties of the polymers formed, reference is made to Müller-Cunradi et al. U. S. Patent No. 2,203,873 and Australian Patent No. 112,875, dated July 31, 1941.

The foregoing description contains a limited number of embodiments of the present invention but it will be understood, however, that numerous variations are permissible without departing from the purview of the invention as defined in the following claims.

What I claim and desire to secure by Letters Patent is:

1. The process of finishing solid high molecular weight polymers prepared from an isoolefin at temperatures below about −40° C. in the presence of a Friedel-Crafts type catalyst which comprises discharging the slurry of polymer in cold low-boiling reaction liquids into a heated liquid medium, flashing off the bulk of the low-boiling reaction liquids and forming a slurry of polymer in said heated liquid medium, stripping the slurry of low-boiling liquids, separating the polymer particles from bulk of liquid in said slurry, passing the separated polymer particles through a dryer, passing heated air over and through the polymer in the dryer to remove residual volatiles and compressing the dried polymer.

2. The process of finishing solid, high molecular weight polymers prepared from an isoolefin at temperatures below about −40° C. in the presence of a Friedel-Crafts type catalyst which comprises discharging the slurry of polymer in cold, low-boiling reaction liquids into heated water in order to form a slurry of polymer in water and fluash off said associated low-boiling materials, stripping said low-boiling materials from the water slurry of polymer, separating the polymer particles from the water slurry, passing the separated polymer particles through a dryer, passing heated air over and through the polymer in the dryer to remove moisture and residual volatiles from the polymer and compressing the dried polymer.

3. The process of finishing solid high molecular weight copolymers prepared from mixtures of a major proportion of an isoolefin and a minor proportion of a polyolefinic material containing up to about 12 carbon atoms per molecule at temperatures below about −40° C. in the presence of a Friedel-Crafts type catalyst which comprises discharging the slurry of polymer in cold, low-boiling reaction liquids into heated water in order to form a slurry of polymer in water and flash off the bulk of said associated low-boiling materials, stripping said low-boiling materials from the water slurry of polymer, separating the polymer particles from the water slurry, passing the separated polymer particles through a dryer, passing heated air over and through a bed of polymer particles passing through the dryer to remove moisture and residual volatiles from the polymer and compressing the dried polymer.

4. The process of finishing solid high molecular weight copolymers prepared from mixtures of a major proportion of an isoolefin and a minor proportion of a polyolefinic material containing up to about 12 carbon atoms per molecule at temperatures below about −40° C. in the presence of a Friedel-Crafts type catalyst which comprises discharging the slurry of polymer in cold low-boiling reaction liquids into heated water in order to form a slurry of polymer in water and flash off the bulk of said associated low-boiling materials, stripping said low-boiling materials from the water slurry of polymer by reducing the pressure on and passing a stripping vapor through said slurry, separating the polymer particles from the water slurry, passing the separated polymer particles through a dryer, passing heated air over and through a bed of polymer particles passing through the drier to remove moisture and residual volatiles from the polymer and compressing the dried polymer.

5. The process of finishing solid high molecular weight copolymers prepared from mixtures of a major proportion of an isoolefin and a minor proportion of a polyolefinic material containing up to about 12 carbon atoms per molecule at temperatures below about −40° C. in the presence of a Friedel-Crafts type catalyst which comprises mixing the slurry of polymer in cold, low-boiling reaction liquids with heated water in order to form a slurry of polymer in water and flash off the bulk of said associated low-boiling materials, stripping said low-boiling materials from the water slurry of polymer, separating the polymer particles from the water slurry, passing the separated polymer particles through a dryer, passing heated air at a velocity of at least 30 feet per minute over and through a bed of polymer particles passing through the dryer to remove moisture and residual volatile materials from the polymer and compressing the dried polymer.

6. The process of finishing solid high molecular weight copolymers prepared from mixtures of a major proportion of an isoolefin and a minor proportion of a polyolefinic material containing up to about 12 carbon atoms per molecule at temperatures below about $-40°$ C. in the presence of a Friedel-Crafts type catalyst which comprises mixing the slurry of polymer in cold, low-boiling reaction liquids with heated water in order to form a slurry of polymer in water and flash off the bulk of said associated low-boiling materials, stripping said low-boiling materials from the water slurry of polymer by reducing the pressure on and passing a stripping vapor through said slurry, separating the polymer particles from the water slurry, passing the separated polymer particles through a dryer, passing heated air at a velocity of at least 30 feet per minute over and through a bed of polymer particles passing through the drier to remove moisture and residual volatile materials from the polymer and compressing the dried polymer.

7. The process of finishing solid high molecular weight copolymers prepared from mixtures of a major proportion of isobutylene and a minor proportion of a conjugated diolefin at temperatures below about $-40°$ C. in the presence of a solution of a Friedel-Crafts type catalyst in a solvent which forms no complex with the catalyst and is liquid at reaction temperature which comprises mixing the slurry of polymer in cold, low-boiling reaction liquids with heated water in order to form a slurry of polymer in water and flash off the bulk of said associated low-boiling materials, stripping said low-boiling materials from the water slurry of polymer by reducing the pressure on and passing a stripping vapor through said slurry, separating the polymer particles from the water slurry, passing the separated polymer particles through a dryer, passing heated air at a velocity of at least 30 feet per minute through the bed of polymer passing through the dryer to remove moisture and residual volatile materials from the polymer and compressing the dried polymer.

8. The process of finishing solid high molecular weight copolymers prepared from mixtures of a major proportion of isobutylene and a minor proportion of isoprene at temperatures below about $-40°$ C. in the presence of a solution of a Friedel-Crafts type catalyst in methyl chloride which comprises mixing the slurry of polymer in cold, low-boiling reaction liquids, with water at about 150° F. in order to form a slurry of polymer in water and flash off the bulk of said associated low-boiling materials, stripping said low-boiling materials from the water slurry of polymer by reducing the pressure on and passing a stripping vapor through said slurry, separating the polymer particles from the water slurry, passing the separated polymer particles through a dryer, passing air at about 160–300° F. at a velocity of about 30 to 350 feet per minute over and through the bed of polymer passing through the dryer to remove moisture and residual volatile materials from the polymer and compressing the dried polymer.

ARTHUR DONALD GREEN.